US011228551B1

(12) United States Patent
Baron et al.

(10) Patent No.: US 11,228,551 B1
(45) Date of Patent: Jan. 18, 2022

(54) MULTIPLE GATEWAY MESSAGE EXCHANGE

(71) Applicant: Snap Inc., Santa Monica, CA (US)

(72) Inventors: Bradley Baron, Seattle, WA (US); Peter Cardwell, Bainbridge Island, WA (US); Benjamin Ralph Hollis, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/789,101

(22) Filed: Feb. 12, 2020

(51) Int. Cl.
*H04L 12/58* (2006.01)
*H04W 4/02* (2018.01)
*H04L 12/66* (2006.01)

(52) U.S. Cl.
CPC ............. *H04L 51/20* (2013.01); *H04L 12/66* (2013.01); *H04L 51/32* (2013.01); *H04W 4/025* (2013.01)

(58) Field of Classification Search
CPC ......... H04L 51/20; H04L 51/32; H04L 12/66; H04W 4/025
See application file for complete search history.

(56) References Cited

U.S. PATENT DOCUMENTS

| 666,223 A | 1/1901 | Shedlock |
|---|---|---|
| 4,581,634 A | 4/1986 | Williams |
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |

(Continued)

FOREIGN PATENT DOCUMENTS

| CA | 2887596 A1 | 7/2015 |
|---|---|---|
| EP | 2051480 A1 | 4/2009 |

(Continued)

OTHER PUBLICATIONS

"A Whole New Story", Snap, Inc., [Online]Retrieved from the Internet: >URL: https://www.snap.com/en-US/news/>, (2017), 13 pgs.

(Continued)

*Primary Examiner* — June Y Sison
(74) *Attorney, Agent, or Firm* — Schwegman Lundberg & Woessner, P.A.

(57) ABSTRACT

Systems and methods are provided for exchanging messages between gateways. The systems and methods include operations for: storing, in a first gateway located in a first geographical region of a plurality of geographical regions, data that associates a plurality of users with the plurality of geographical regions; receiving, by the first gateway, a message directed to a given user of the plurality of users; determining, based on the data, that a second geographical region of the plurality of geographical regions is associated with the given user; and transmitting, by the first gateway, the message to a second gateway located in the second geographical region.

20 Claims, 9 Drawing Sheets

(56) References Cited

U.S. PATENT DOCUMENTS

| | | | |
|---|---|---|---|
| 6,038,295 A | 3/2000 | Mattes | |
| 6,049,711 A | 4/2000 | Yehezkel et al. | |
| 6,154,764 A | 11/2000 | Nitta | |
| 6,167,435 A | 12/2000 | Druckenmiller et al. | |
| 6,204,840 B1 | 3/2001 | Petelycky et al. | |
| 6,205,432 B1 | 3/2001 | Gabbard et al. | |
| 6,216,141 B1 | 4/2001 | Straub et al. | |
| 6,285,381 B1 | 9/2001 | Sawano et al. | |
| 6,285,987 B1 | 9/2001 | Roth et al. | |
| 6,310,694 B1 | 10/2001 | Okimoto et al. | |
| 6,317,789 B1 | 11/2001 | Rakavy et al. | |
| 6,334,149 B1 | 12/2001 | Davis, Jr. et al. | |
| 6,349,203 B1 | 2/2002 | Asaoka et al. | |
| 6,353,170 B1 | 3/2002 | Eyzaguirre et al. | |
| 6,446,004 B1 | 9/2002 | Cao et al. | |
| 6,449,657 B2 | 9/2002 | Stanbach | |
| 6,456,852 B2 | 9/2002 | Bar | |
| 6,484,196 B1 | 11/2002 | Maurille | |
| 6,487,601 B1 | 11/2002 | Hubacher et al. | |
| 6,523,008 B1 | 2/2003 | Avrunin | |
| 6,542,749 B2 | 4/2003 | Tanaka et al. | |
| 6,549,768 B1 | 4/2003 | Fraccaroli | |
| 6,618,593 B1 | 9/2003 | Drutman et al. | |
| 6,622,174 B1 | 9/2003 | Ukita et al. | |
| 6,631,463 B1 | 10/2003 | Floyd et al. | |
| 6,636,247 B1 | 10/2003 | Hamzy et al. | |
| 6,636,855 B2 | 10/2003 | Holloway et al. | |
| 6,643,684 B1 | 11/2003 | Malkin et al. | |
| 6,658,095 B1 | 12/2003 | Yoakum et al. | |
| 6,665,531 B1 | 12/2003 | Soderbacka et al. | |
| 6,668,173 B2 | 12/2003 | Greene | |
| 6,684,238 B1 | 1/2004 | Dutta | |
| 6,684,257 B1 | 1/2004 | Camut et al. | |
| 6,698,020 B1 | 2/2004 | Zigmond et al. | |
| 6,700,506 B1 | 3/2004 | Winkler | |
| 6,720,860 B1 | 4/2004 | Narayanaswami | |
| 6,724,403 B1 | 4/2004 | Santoro et al. | |
| 6,757,713 B1 | 6/2004 | Ogilvie et al. | |
| 6,763,226 B1 * | 7/2004 | McZeal, Jr. | H04M 1/7243 455/90.2 |
| 6,832,222 B1 | 12/2004 | Zimowski | |
| 6,834,195 B2 | 12/2004 | Brandenberg et al. | |
| 6,836,792 B1 | 12/2004 | Chen | |
| 6,898,626 B2 | 5/2005 | Ohashi | |
| 6,959,324 B1 | 10/2005 | Kubik et al. | |
| 6,970,088 B2 | 11/2005 | Kovach | |
| 6,970,907 B1 | 11/2005 | Ullmann et al. | |
| 6,980,909 B2 | 12/2005 | Root et al. | |
| 6,981,040 B1 | 12/2005 | Konig et al. | |
| 7,020,494 B2 | 3/2006 | Spriestersbach et al. | |
| 7,027,124 B2 | 4/2006 | Foote et al. | |
| 7,072,963 B2 | 7/2006 | Anderson et al. | |
| 7,085,571 B2 | 8/2006 | Kalhan et al. | |
| 7,110,744 B2 | 9/2006 | Freeny, Jr. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,188,143 B2 | 3/2007 | Szeto | |
| 7,203,380 B2 | 4/2007 | Chiu et al. | |
| 7,206,568 B2 | 4/2007 | Sudit | |
| 7,227,937 B1 | 6/2007 | Yoakum et al. | |
| 7,237,002 B1 | 6/2007 | Estrada et al. | |
| 7,240,089 B2 | 7/2007 | Boudreau | |
| 7,269,426 B2 | 9/2007 | Kokkonen et al. | |
| 7,280,658 B2 | 10/2007 | Amini et al. | |
| 7,315,823 B2 | 1/2008 | Brondrup | |
| 7,349,768 B2 | 3/2008 | Bruce et al. | |
| 7,356,564 B2 | 4/2008 | Hartselle et al. | |
| 7,394,345 B1 | 7/2008 | Ehlinger et al. | |
| 7,411,493 B2 | 8/2008 | Smith | |
| 7,423,580 B2 | 9/2008 | Markhovsky et al. | |
| 7,454,442 B2 | 11/2008 | Cobleigh et al. | |
| 7,508,419 B2 | 3/2009 | Toyama et al. | |
| 7,519,870 B1 | 4/2009 | Hagale et al. | |
| 7,535,890 B2 | 5/2009 | Rojas | |
| 7,546,554 B2 | 6/2009 | Chiu | |
| 7,607,096 B2 | 10/2009 | Oreizy et al. | |
| 7,639,943 B1 | 12/2009 | Kaiajan | |
| 7,650,231 B2 | 1/2010 | Gadler | |
| 7,668,537 B2 | 2/2010 | DeVries | |
| 7,770,137 B2 | 8/2010 | Forbes et al. | |
| 7,778,973 B2 | 8/2010 | Choi | |
| 7,779,444 B2 | 8/2010 | Glad | |
| 7,787,886 B2 | 8/2010 | Markhovsky | |
| 7,796,946 B2 | 9/2010 | Eisenbach | |
| 7,801,954 B2 | 9/2010 | Cadiz et al. | |
| 7,856,360 B2 | 12/2010 | Kramer et al. | |
| 7,890,087 B2 * | 2/2011 | O'Neil | H04N 7/17318 455/414.1 |
| 8,061,204 B2 | 8/2011 | Burtner et al. | |
| 8,032,586 B2 | 10/2011 | Challenger et al. | |
| 8,082,255 B1 | 12/2011 | Carlson, Jr. et al. | |
| 8,090,351 B2 | 1/2012 | Klein | |
| 8,098,904 B2 | 1/2012 | Ioffe et al. | |
| 8,099,109 B2 | 1/2012 | Altman et al. | |
| 8,112,716 B2 | 2/2012 | Kobayashi | |
| 8,131,597 B2 | 3/2012 | Hudetz | |
| 8,135,166 B2 | 3/2012 | Rhoads | |
| 8,136,028 B1 | 3/2012 | Loeb et al. | |
| 8,146,001 B1 | 3/2012 | Reese | |
| 8,161,115 B2 | 4/2012 | Yamamoto | |
| 8,161,417 B1 | 4/2012 | Lee | |
| 8,195,203 B1 | 6/2012 | Tseng | |
| 8,199,747 B2 | 6/2012 | Rojas et al. | |
| 8,208,943 B2 | 6/2012 | Petersen | |
| 8,214,443 B2 | 7/2012 | Hamburg | |
| 8,234,350 B1 | 7/2012 | Gu et al. | |
| 8,276,092 B1 | 9/2012 | Narayanan et al. | |
| 8,279,319 B2 | 10/2012 | Date | |
| 8,280,406 B2 | 10/2012 | Ziskind et al. | |
| 8,285,199 B2 | 10/2012 | Hsu et al. | |
| 8,287,380 B2 | 10/2012 | Nguyen et al. | |
| 8,301,159 B2 | 10/2012 | Hamynen et al. | |
| 8,306,922 B1 | 11/2012 | Kunal et al. | |
| 8,312,086 B2 | 11/2012 | Velusamy et al. | |
| 8,312,097 B1 | 11/2012 | Siegel et al. | |
| 8,326,315 B2 | 12/2012 | Phillips et al. | |
| 8,326,327 B2 | 12/2012 | Hymel et al. | |
| 8,332,475 B2 | 12/2012 | Rosen et al. | |
| 8,352,546 B1 | 1/2013 | Dollard | |
| 8,379,130 B2 | 2/2013 | Forutanpour et al. | |
| 8,385,950 B1 | 2/2013 | Wagner et al. | |
| 8,402,097 B2 | 3/2013 | Szeto | |
| 8,405,773 B2 | 3/2013 | Hayashi et al. | |
| 8,418,067 B2 | 4/2013 | Cheng | |
| 8,423,409 B2 | 4/2013 | Rao | |
| 8,471,914 B2 | 6/2013 | Sakiyama et al. | |
| 8,472,935 B1 | 6/2013 | Fujisaki | |
| 8,510,383 B2 | 8/2013 | Hurley et al. | |
| 8,527,345 B2 | 9/2013 | Rothschild et al. | |
| 8,554,627 B2 | 10/2013 | Svendsen et al. | |
| 8,560,612 B2 | 10/2013 | Kilmer et al. | |
| 8,594,680 B2 | 11/2013 | Ledlie et al. | |
| 8,613,089 B1 | 12/2013 | Holloway et al. | |
| 8,660,358 B1 | 2/2014 | Bergboer et al. | |
| 8,660,369 B2 | 2/2014 | Llano et al. | |
| 8,660,793 B2 | 2/2014 | Ngo et al. | |
| 8,682,350 B2 | 3/2014 | Altman et al. | |
| 8,718,333 B2 | 5/2014 | Wolf et al. | |
| 8,724,622 B2 | 5/2014 | Rojas | |
| 8,732,168 B2 | 5/2014 | Johnson | |
| 8,744,523 B2 | 6/2014 | Fan et al. | |
| 8,745,132 B2 | 6/2014 | Obradovich | |
| 8,761,800 B2 | 6/2014 | Kuwahara | |
| 8,768,876 B2 | 7/2014 | Shim et al. | |
| 8,775,972 B2 | 7/2014 | Spiegel | |
| 8,788,680 B1 | 7/2014 | Naik | |
| 8,790,187 B2 | 7/2014 | Walker et al. | |
| 8,797,415 B2 | 8/2014 | Arnold | |
| 8,798,646 B1 | 8/2014 | Wang et al. | |
| 8,856,349 B2 | 10/2014 | Jain et al. | |
| 8,874,677 B2 | 10/2014 | Rosen et al. | |
| 8,886,227 B2 | 11/2014 | Schmidt et al. | |
| 8,909,679 B2 | 12/2014 | Root et al. | |

(56) References Cited

U.S. PATENT DOCUMENTS

| | | | |
|---|---|---|---|
| 8,909,725 B1 | 12/2014 | Sehn | |
| 8,972,357 B2 | 3/2015 | Shim et al. | |
| 8,995,433 B2 | 3/2015 | Rojas | |
| 9,015,285 B1 | 4/2015 | Ebsen et al. | |
| 9,020,745 B2 | 4/2015 | Johnston et al. | |
| 9,040,574 B2 | 5/2015 | Wang et al. | |
| 9,055,416 B2 | 6/2015 | Rosen et al. | |
| 9,094,137 B1 | 7/2015 | Sehn et al. | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,119,027 B2 | 8/2015 | Sharon et al. | |
| 9,123,074 B2 | 9/2015 | Jacobs | |
| 9,143,382 B2 | 9/2015 | Bhogal et al. | |
| 9,143,681 B1 | 9/2015 | Ebsen et al. | |
| 9,152,477 B1 | 10/2015 | Campbell et al. | |
| 9,191,776 B2 | 11/2015 | Root et al. | |
| 9,204,252 B2 | 12/2015 | Root | |
| 9,225,897 B1 | 12/2015 | Sehn et al. | |
| 9,258,459 B2 | 2/2016 | Hartley | |
| 9,344,606 B2 | 5/2016 | Hartley et al. | |
| 9,385,983 B1 | 7/2016 | Sehn | |
| 9,396,354 B1 | 7/2016 | Murphy et al. | |
| 9,407,816 B1 | 8/2016 | Sehn | |
| 9,430,783 B1 | 8/2016 | Sehn | |
| 9,439,041 B2 | 9/2016 | Parvizi et al. | |
| 9,443,227 B2 | 9/2016 | Evans et al. | |
| 9,450,907 B2 | 9/2016 | Pridmore et al. | |
| 9,459,778 B2 | 10/2016 | Hogeg et al. | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,628,950 B1 | 4/2017 | Noeth et al. | |
| 9,710,821 B2 | 7/2017 | Heath | |
| 9,854,219 B2 | 12/2017 | Sehn | |
| 2002/0047868 A1 | 4/2002 | Miyazawa | |
| 2002/0078456 A1 | 6/2002 | Hudson et al. | |
| 2002/0087631 A1 | 7/2002 | Sharma | |
| 2002/0097257 A1 | 7/2002 | Miller et al. | |
| 2002/0122659 A1 | 9/2002 | Mcgrath et al. | |
| 2002/0128047 A1 | 9/2002 | Gates | |
| 2002/0144154 A1 | 10/2002 | Tomkow | |
| 2003/0001846 A1 | 1/2003 | Davis et al. | |
| 2003/0016247 A1 | 1/2003 | Lai et al. | |
| 2003/0017823 A1 | 1/2003 | Mager et al. | |
| 2003/0020623 A1 | 1/2003 | Cao et al. | |
| 2003/0023874 A1 | 1/2003 | Prokupets et al. | |
| 2003/0037124 A1 | 2/2003 | Yamaura et al. | |
| 2003/0052925 A1 | 3/2003 | Daimon et al. | |
| 2003/0101230 A1 | 5/2003 | Benschoter et al. | |
| 2003/0110503 A1 | 6/2003 | Perkes | |
| 2003/0126215 A1 | 7/2003 | Udell | |
| 2003/0148773 A1 | 8/2003 | Spriestersbach et al. | |
| 2003/0164856 A1 | 9/2003 | Prager et al. | |
| 2003/0229607 A1 | 12/2003 | Zellweger et al. | |
| 2004/0027371 A1 | 2/2004 | Jaeger | |
| 2004/0064429 A1 | 4/2004 | Hirstius et al. | |
| 2004/0078367 A1 | 4/2004 | Anderson et al. | |
| 2004/0111467 A1 | 6/2004 | Willis | |
| 2004/0158739 A1 | 8/2004 | Wakai et al. | |
| 2004/0189465 A1 | 9/2004 | Capobianco et al. | |
| 2004/0203959 A1 | 10/2004 | Coombes | |
| 2004/0215625 A1 | 10/2004 | Svendsen et al. | |
| 2004/0243531 A1 | 12/2004 | Dean | |
| 2004/0243688 A1 | 12/2004 | Wugofski | |
| 2005/0021444 A1 | 1/2005 | Bauer et al. | |
| 2005/0022211 A1 | 1/2005 | Veselov et al. | |
| 2005/0048989 A1 | 3/2005 | Jung | |
| 2005/0078804 A1 | 4/2005 | Yomoda | |
| 2005/0097176 A1 | 5/2005 | Schatz et al. | |
| 2005/0102381 A1 | 5/2005 | Jiang et al. | |
| 2005/0104976 A1 | 5/2005 | Currans | |
| 2005/0119936 A1 | 6/2005 | Buchanan et al. | |
| 2005/0122405 A1 | 6/2005 | Voss et al. | |
| 2005/0193340 A1 | 9/2005 | Amburgey et al. | |
| 2005/0193345 A1 | 9/2005 | Klassen et al. | |
| 2005/0198128 A1 | 9/2005 | Anderson | |
| 2005/0223066 A1 | 10/2005 | Buchheit et al. | |
| 2005/0288954 A1 | 12/2005 | McCarthy et al. | |
| 2006/0026067 A1 | 2/2006 | Nicholas et al. | |
| 2006/0107297 A1 | 5/2006 | Toyama et al. | |
| 2006/0114338 A1 | 6/2006 | Rothschild | |
| 2006/0119882 A1 | 6/2006 | Harris et al. | |
| 2006/0206610 A1* | 9/2006 | Ling | H04L 67/26 709/226 |
| 2006/0242239 A1 | 10/2006 | Morishima et al. | |
| 2006/0252438 A1 | 11/2006 | Ansamaa et al. | |
| 2006/0265417 A1 | 11/2006 | Amato et al. | |
| 2006/0270419 A1 | 11/2006 | Crowley et al. | |
| 2006/0287878 A1 | 12/2006 | Wadhwa et al. | |
| 2007/0004426 A1 | 1/2007 | Pfleging et al. | |
| 2007/0038715 A1 | 2/2007 | Collins et al. | |
| 2007/0040931 A1 | 2/2007 | Nishizawa | |
| 2007/0073517 A1 | 3/2007 | Panje | |
| 2007/0073823 A1 | 3/2007 | Cohen et al. | |
| 2007/0075898 A1 | 4/2007 | Markhovsky et al. | |
| 2007/0082707 A1 | 4/2007 | Flynt et al. | |
| 2007/0136228 A1 | 6/2007 | Petersen | |
| 2007/0192128 A1 | 8/2007 | Celestini | |
| 2007/0198340 A1 | 8/2007 | Lucovsky et al. | |
| 2007/0198495 A1 | 8/2007 | Buron et al. | |
| 2007/0208751 A1 | 9/2007 | Cowan et al. | |
| 2007/0210936 A1 | 9/2007 | Nicholson | |
| 2007/0214180 A1 | 9/2007 | Crawford | |
| 2007/0214216 A1 | 9/2007 | Carrer et al. | |
| 2007/0233556 A1 | 10/2007 | Koningstein | |
| 2007/0233801 A1 | 10/2007 | Eren et al. | |
| 2007/0233859 A1 | 10/2007 | Zhao et al. | |
| 2007/0243887 A1 | 10/2007 | Bandhole et al. | |
| 2007/0244750 A1 | 10/2007 | Grannan et al. | |
| 2007/0255456 A1 | 11/2007 | Funayama | |
| 2007/0281690 A1 | 12/2007 | Altman et al. | |
| 2008/0022329 A1 | 1/2008 | Glad | |
| 2008/0025701 A1 | 1/2008 | Ikeda | |
| 2008/0032703 A1 | 2/2008 | Krumm et al. | |
| 2008/0033930 A1 | 2/2008 | Warren | |
| 2008/0043041 A2 | 2/2008 | Hedenstroem et al. | |
| 2008/0049704 A1 | 2/2008 | Witteman et al. | |
| 2008/0062141 A1 | 3/2008 | Chandhri | |
| 2008/0076505 A1 | 3/2008 | Ngyen et al. | |
| 2008/0092233 A1 | 4/2008 | Tian et al. | |
| 2008/0094387 A1 | 4/2008 | Chen | |
| 2008/0104503 A1 | 5/2008 | Beall et al. | |
| 2008/0109844 A1 | 5/2008 | Baldeschweiler et al. | |
| 2008/0120409 A1 | 5/2008 | Sun et al. | |
| 2008/0147730 A1 | 6/2008 | Lee et al. | |
| 2008/0148150 A1 | 6/2008 | Mall | |
| 2008/0158230 A1 | 7/2008 | Sharma et al. | |
| 2008/0168033 A1 | 7/2008 | Ott et al. | |
| 2008/0168489 A1 | 7/2008 | Schraga | |
| 2008/0189177 A1 | 8/2008 | Anderton et al. | |
| 2008/0207176 A1 | 8/2008 | Brackbill et al. | |
| 2008/0208692 A1 | 8/2008 | Garaventi et al. | |
| 2008/0021421 A1 | 9/2008 | Rasanen et al. | |
| 2008/0222545 A1 | 9/2008 | Lemay | |
| 2008/0255976 A1 | 10/2008 | Altberg et al. | |
| 2008/0256446 A1 | 10/2008 | Yamamoto | |
| 2008/0256577 A1 | 10/2008 | Funaki et al. | |
| 2008/0266421 A1 | 10/2008 | Takahata et al. | |
| 2008/0270938 A1 | 10/2008 | Carlson | |
| 2008/0288338 A1 | 11/2008 | Wiseman et al. | |
| 2008/0306826 A1 | 12/2008 | Kramer et al. | |
| 2008/0313329 A1 | 12/2008 | Wang et al. | |
| 2008/0313346 A1 | 12/2008 | Kujawa et al. | |
| 2008/0318616 A1 | 12/2008 | Chipalkatti et al. | |
| 2009/0006191 A1 | 1/2009 | Arankalle et al. | |
| 2009/0006565 A1 | 1/2009 | Velusamy et al. | |
| 2009/0015703 A1 | 1/2009 | Kim et al. | |
| 2009/0024956 A1 | 1/2009 | Kobayashi | |
| 2009/0030774 A1 | 1/2009 | Rothschild et al. | |
| 2009/0030999 A1 | 1/2009 | Gatzke et al. | |
| 2009/0040324 A1 | 2/2009 | Nonaka | |
| 2009/0042588 A1 | 2/2009 | Lottin et al. | |

(56) References Cited

U.S. PATENT DOCUMENTS

| | | |
|---|---|---|
| 2009/0058822 A1 | 3/2009 | Chaudhri |
| 2009/0079846 A1 | 3/2009 | Chou |
| 2009/0008971 A1 | 4/2009 | Wood et al. |
| 2009/0089678 A1 | 4/2009 | Sacco et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis et al. |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0177752 A1* | 7/2010 | Aggarwal ............ H04L 45/50 370/338 |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore et al. |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0001651 A1 | 6/2012 | Lalancette et al. |
| 2012/0143760 A1 | 6/2012 | Abulafia et al. |
| 2012/0150978 A1 | 6/2012 | Monaco |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0214506 A1* | 8/2012 | Skaaksrud ............ H04W 40/20 455/456.1 |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi et al. |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormaid et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |

(56) References Cited

U.S. PATENT DOCUMENTS

| | | |
|---|---|---|
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0060964 A1* | 3/2013 | Shahar ................ H04L 45/74 709/244 |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvl et al. |
| 2014/0129953 A1 | 5/2014 | Spiegel et al. |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0373108 A1* | 12/2015 | Fleming ............. G06F 12/1408 709/213 |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0132784 A1* | 5/2016 | Bevan .................... G06N 5/04 706/52 |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0249200 A1* | 8/2016 | Liu ...................... H04L 12/189 |
| 2016/0277419 A1 | 9/2016 | Allen et al. |
| 2016/0301724 A1* | 10/2016 | Kodaypak ........... H04L 65/103 |
| 2016/0321708 A1 | 11/2016 | Sehn |
| 2017/0006094 A1 | 1/2017 | Abou Mahmoud et al. |
| 2017/0061308 A1 | 3/2017 | Chen et al. |
| 2017/0093688 A1* | 3/2017 | Tarricone ........... H04L 45/3065 |
| 2017/0287006 A1 | 10/2017 | Azmoodeh et al. |
| 2018/0102985 A1* | 4/2018 | Byers .................... H04L 47/80 |
| 2019/0097940 A1* | 3/2019 | Cheng ................ H04L 12/4633 |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A | 4/2011 |
| WO | WO-2011119407 A1 | 9/2011 |
| WO | WO-2013008238 A1 | 1/2013 |

(56) References Cited

FOREIGN PATENT DOCUMENTS

| WO | WO-2013045753 A1 | 4/2013 |
|---|---|---|
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |

OTHER PUBLICATIONS

"Adding photos to your listing", eBay, [Online] Retrieved from the Internet: <URL: http://pages.ebay.com/help/sell/pictures.html>, (accessed May 24, 2017), 4 pgs.

"BlogStomp", StompSoftware, [Online] Retrieved from the Internet: <URL: http://stompsoftware.com/blogstomp>, (accessed May 24, 2017), 12 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"InstaPlace Photo App Tell The Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, international Search Report dated Sep. 29, 2015", 2 pgs.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Macy's Believe-0-Magic", [Online] Retrieved from the Internet: <URL: https://web.archive.org/web/20190422101854/https://www.youtube.com/watch?v=xyzRXy3J0Z0&feature=youtu.be>, (Nov. 7, 2011), 102 pgs.; 00:51 min.

"Macy's introduces Augmented Reality Experience in Stores across Country as Part of its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the internet: <URL: https://www.youtube.com/watch?v=RWwQXi9RGQw>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Janthong, Isaranu, "Instaplace ready on Android Google Play store", Android App Review Thailand, [Online] Retrieved from the Internet: <URL: http://www.android-free-app-review.com/2013/01/instaplace-android-googie-play-store.html>, (Jan. 23, 2013), 9 pgs.

MacLeod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Tripathi, Rohit, "Watermark Images in PHP And Save File on Server", [Online] Retrieved from the Internet: <URL: http://code.rohitink.com/2012/12/28/watermark-images-in-php-and-save-file-on-server, (Dec. 28, 2012), 4 pgs.

\* cited by examiner

MULTIPLE GATEWAY MESSAGE EXCHANGE

TECHNICAL FIELD

The present disclosure generally relates to the technical field of social networks. In particular, the present embodiments are generally directed to managing message exchanges.

BACKGROUND

As the popularity of social networking grows, social networks are expanding their capabilities. To improve ease of use, social networks are integrating more and more functions such that a user may accomplish many or even most of their computer-based tasks within the social network itself. One vision of social networks is that they eventually become a virtual operating system, from which a user seldom finds a need to remove themselves.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
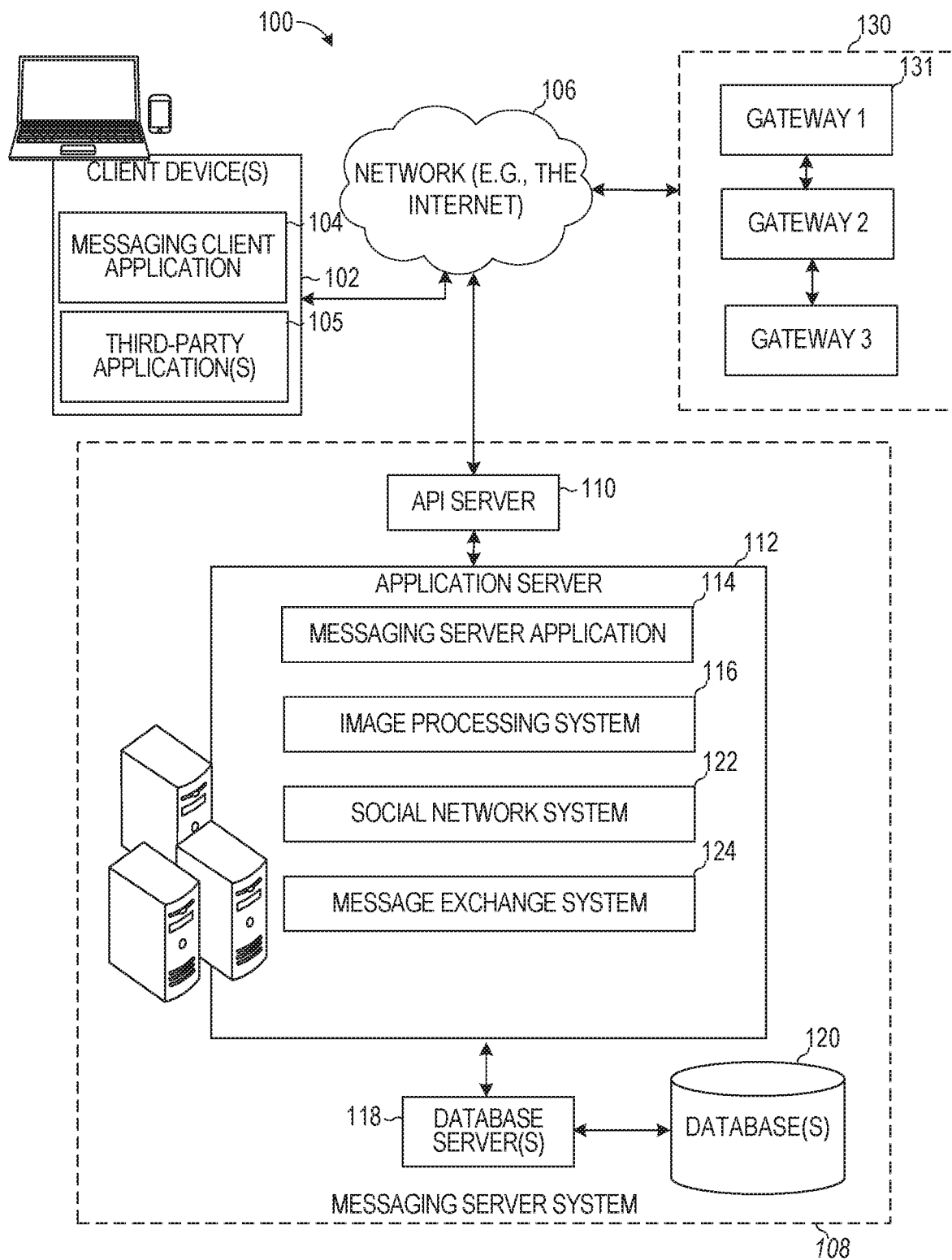
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Often, users consume media content, and specifically videos, on their mobile device. Such media content is typically exchanged in chat sessions between users. Sometimes users log on and log off a server that maintains the contents of the chat sessions. In order to ensure that the latest chat messages, which were exchanged in the chat session while the user device has been disconnected from the server, are presented to the user, a user device synchronizes with the server. Typically, the server that is used to synchronize the messages is located in one geographical location. Users who are located far away from that server, such as in another country, experience large latencies when they try to synchronize their devices. Also, synchronizing such content between a server and user devices that are in various geographical locations consumes a great deal of processing resources and network bandwidth, which makes synchronization sessions operate inefficiently. In addition, synchronizing such content can take a long time, which further delays presenting the latest chat messages to the user and can end up frustrating the users.

The disclosed embodiments improve the efficiency of using the electronic device by providing a system that efficiently synchronizes content between a server and a user device. According to the disclosed system, multiple gateways are distributed throughout the world, such as in multiple geographical locations. The gateways maintain data that identifies the geographical locations in which different users are located and to which gateways the users normally connect. Based on this data, when a first gateway receives a message directed to a given user who is located in a second geographical area that is different from a first geographical area in which the first gateway is located, the first gateway can forward the message to a second gateway that is in the second geographical area. In this way, when the given user desires to synchronize its content, a device of the given user can connect to the second gateway to receive the message faster and more efficiently and with a lower amount of latency than by connecting to the first gateway. Namely, rather than the given user experiencing large latencies by receiving message updates from the first gateway, which is geographically far from the given user because it is in a different geographical location, the given user can receive such message updates from a closer gateway and may not need to connect to the first gateway at all. This increases the efficiencies of the electronic device by reducing processing times and network bandwidth needed to accomplish a task.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access a message exchange system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. For example, the third-party application 105 can be a social networking application, a dating application, a ride or car sharing application, a shopping application, a trading application, a gaming application, or an imaging application.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., images or video) from a messaging client application 104 to the messaging server application 114, and for possible access by another messaging client application 104 or third-party application 105; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the message exchange system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the message exchange system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The message exchange system 124 manages synchronization of messages exchanged in a communication session. For example, the message exchange system 124 establishes a communication session between a plurality of users (e.g., a chat session in which multiple chat messages are exchanged). The messaging client application 104 implemented on the client device 102 communicates with the message exchange system 124 to receive messages transmitted as part of the communication session. Specifically, messages are sent from one user to another via the message exchange system 124. The message exchange system 124 keeps track of all the messages that are exchanged and sends updates to client device 102 that are connected to the message exchange system 124. In some cases, the messages include messages exchanged between users. In some cases, the messages may be received from third-party applications and are directed to one or more users.

Messaging system 100 includes a plurality of gateways 130. Each gateway 131 of the plurality of gateways 130 may implement some or all of the functionality of application server 112. Each gateway 131 may be located in a different geographical location and is configured to provide messages to users in the geographical location in which the gateway 131 is located. For example, a first gateway 131 may be located in a first geographical region (e.g., United States of America). The first gateway 131 is configured to communicate with user devices which are located in the first geographical region (e.g., United States of America). A second gateway 131 may be located in a second geographical region (e.g., China). The second gateway 131 is configured to communicate with user devices which are located in the second geographical region (e.g., China).

In some embodiments, a first instance of the message exchange system 124 implemented by one of the gateways 130 is configured to forward or receive messages to/from another instance of the message exchange system 124 implemented by another one of the gateways 130. As an example, a first user device of a first user (e.g., via an application on the device) generates a message that is directed to a second user device of a second user. The first user device may be located in a first geographical region and the second user device may be located in a second geographical region. The message may be sent by a client device 102 of the first user or application and received by the first gateway 131 located in the first geographical region. The message exchange system 124 in each of the gateways 130 stores a database that associates different users of the messaging client application 104 with respective one or more geographical regions. The message exchange system 124 in the first gateway 131 searches the database to identify one or more geographical regions associated with the second user to whom the message is directed. In one example, the message exchange system 124 determines that the second user is located in a second geographical region according to the database. In response, the message exchange system 124 identifies a second gateway 131 that is located in the second geographical region and forwards or transmits the message to the second gateway 131 in the second geographical region. In some cases, the first gateway 131 may periodically or continuously receive location information from the client device 102 of the second user and may determine the location of the user based on the received location information. In such cases, the first gateway 131 forwards the message to another gateway 131 that is in the current location of the user based on the received location information rather than based on the data stored in the database.

The second gateway 131 stores the message in a record associated with the second user. At some later time, the client device 102 of the second user may communicate with the second gateway 131 to request messages that were directed to the second user. The second gateway 131 retrieves the message received from the first gateway 131 at some previous time and provides the message to the client device 102 of the second user.

In some embodiments, each client device 102 maintains a persistent bi-directional communication path via network 106 with a respective one of gateways 130. As an example, a first client device 102 in a first geographical region maintains a persistent bi-directional communication path with the first gateway 131 located in the first geographical region. A second client device 102 in a second geographical region maintains a persistent bi-directional communication path with the second gateway 131 located in the second geographical region. When the first gateway 131 receives a message that is directed to the second user in the second geographical location, the first gateway 131 forwards the message automatically to the second gateway 131 located in the second geographical location. Using the persistent bi-directional communication path, the second gateway 131, in response to receiving the message from the first gateway 131, sends the message to the second client device 102 and causes the second client device 102 to present the message to the second user.

In some cases, a given user is associated with multiple geographical locations in the database. For example, the given user may be a traveler who frequently visits a third geographical location and who lives at the second geographical location. The database maintained by the message exchange system 124 may store timestamps each time the given user connects to a different gateway and may use the timestamps to determine the frequency and recency at which the given user connects to different gateways. In some implementations, the first gateway 131 receives a message that is directed to the given user. The first gateway 131 determines that the given user is associated with the second geographical location and the third geographical location. In response, the first gateway 131 transmits automatically the message to the second gateway 131 located in the second geographical location and to a third gateway 131 located in the third geographical location. The first gateway 131 may not send the message to a fourth gateway in a fourth geographical location as the given user is not associated with the fourth geographical location. In this way, when the client device 102 of the given user connects either to the second or to the third gateway 131, the client device 102 of the given user receives the message that was directed to the given user from the first user.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated with and hosted by a second, different entity. In some implementations, database 120 stores user data that the first entity collects about various each of the users of a service provided by the first entity. For example, the user data includes user names, passwords, addresses, friends, activity information, preferences, videos or content consumed by the user, and so forth.

Figure 2:
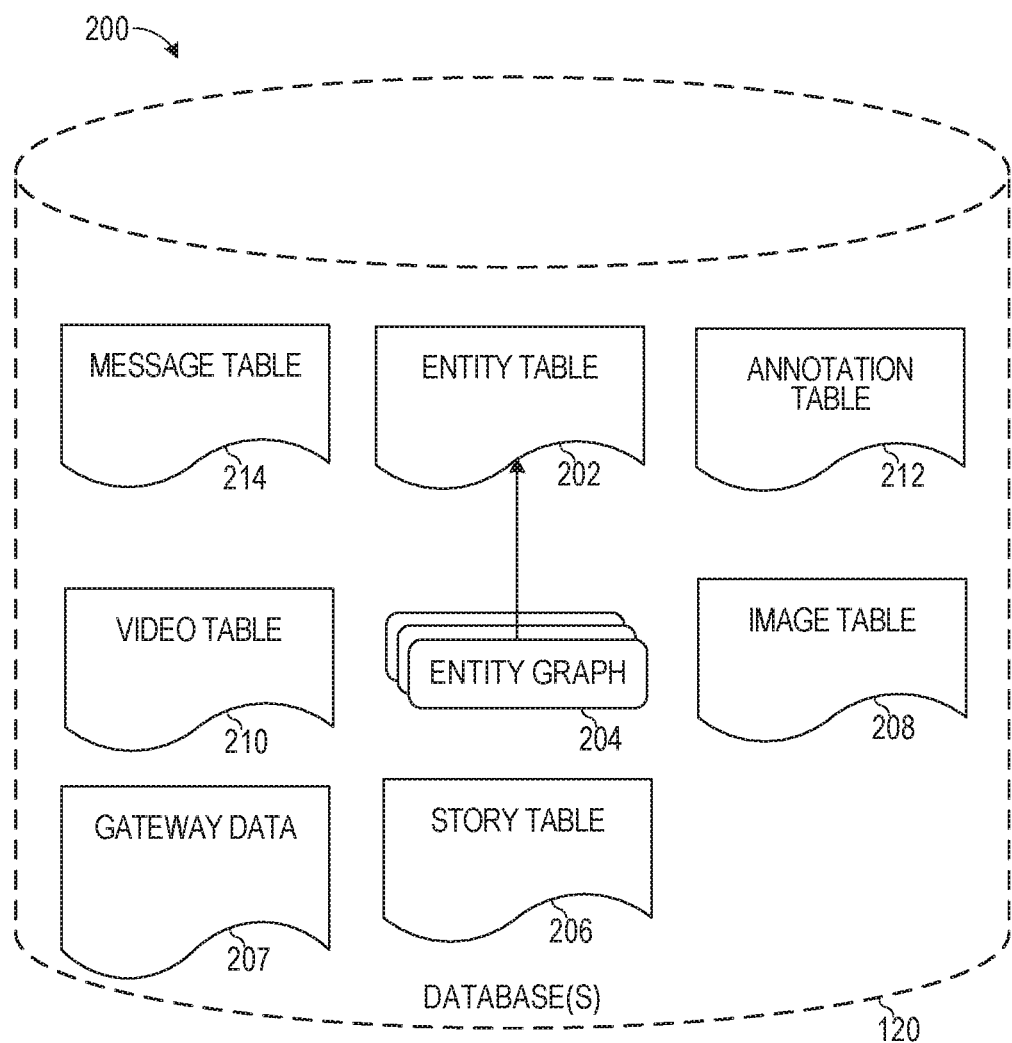
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Gateway data 207 stores various information about gateways to which different users throughout the world connect. For example, the gateway data 207 stores a user identifier, one or more geographical regions associated with the user identifier (e.g., identifiers of the one or more geographical regions), one or more gateways associated with the one or more geographical regions (or identifiers of the geographical regions), and/or one or more timestamps indicating when updates were sent to the user associated with the user identifier. In some cases, the gateway data 207 stores information that indicates how frequently (e.g., how many times in a given period of time, such as a day, week, month or year) a given user connects to a particular gateway in a particular geographical region. In some cases, the gateway data 207 stores information that indicates how frequently a given user connects to different gateways in different geographical areas. Based on the gateway data 207, a given gateway can determine which one or more of a plurality of gateways are associated with a given user to whom a message is directed. The given gateway can then proactively and automatically (without receiving a specific request from the given user) send messages directed to the given user to the one or more gateways that are associated with the given user.

In some embodiments, the gateway data 207 is continuously updated and/or created by various ones of gateways 130. As an example, the first gateway 131 in a first geographical region detects a connection from a client device 102 of a first user. In response, the first gateway 131 receives an identifier of the first user and searches the gateway data 207 for an entry that includes the identifier of the first user. In some cases, the gateway data 207 does not include an entry for the first user. In such cases, the first gateway 131 generates an entry that includes the identifier of the first user and an identifier of the geographical region of the first gateway 131 to which the first user connected. In some cases, the entry also includes a timestamp indicating when the first user connected to the first gateway 131. The entry is stored in the gateway data 207 and is replicated or shared with all of the gateways 130 (e.g., the gateway data 207 stored by each of the gateways 131 is updated with the newly generated entry).

In some embodiments, the first gateway 131 in the first geographical region detects a connection from a client device 102 of a second user. In response, the first gateway 131 receives an identifier of the second user and searches the gateway data 207 for an entry that includes the identifier of the second user. In some cases, the entry of the second user in the gateway data 207 is associated with the first geographical region of the first gateway 131. In such cases, the first gateway 131 may not update any fields in the entry at all to avoid sending updates to other gateways 131. In some cases, the first gateway 131 updates or increments a counter or timestamp representing how frequently and recently the second user connected to the first gateway 131 in the first region. In response to updating the counter or timestamp, the first gateway 131 may share or replicate this change to all of the other gateways 130.

In some embodiments, a second gateway 131 in a second geographical region detects a connection from a client device 102 of a third user. In response, the second gateway 131 receives an identifier of the third user and searches the gateway data 207 for an entry that includes the identifier of the third user. In some cases, the entry of the third user in the gateway data 207 is associated with the first geographical region of the first gateway 131. In such cases, the second gateway 131 updates the fields in the entry to indicate that the third user is also associated with the second geographical region of the second gateway 131. Namely, the third user may be a transient user that visits multiple geographical regions and, in such cases, the third user may be associated with multiple geographical regions in the gateway data 207. In some cases, the second gateway 131 updates or increments a counter or timestamp representing how frequently and recently the third user connected to the second gateway 131 in the second region relative to the first gateway in the first region. The second gateway 131 may share or replicate changes to the entry of the third user to all of the other gateways 130. In some cases, to share or replicate the changes, the second gateway 131 transmits the entire database contained in the gateway data 207 to all other gateways 130. In some cases, to share or replicate the changes, the second gateway 131 transmits only the data that changed in the gateway data 207 to all other gateways 130.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
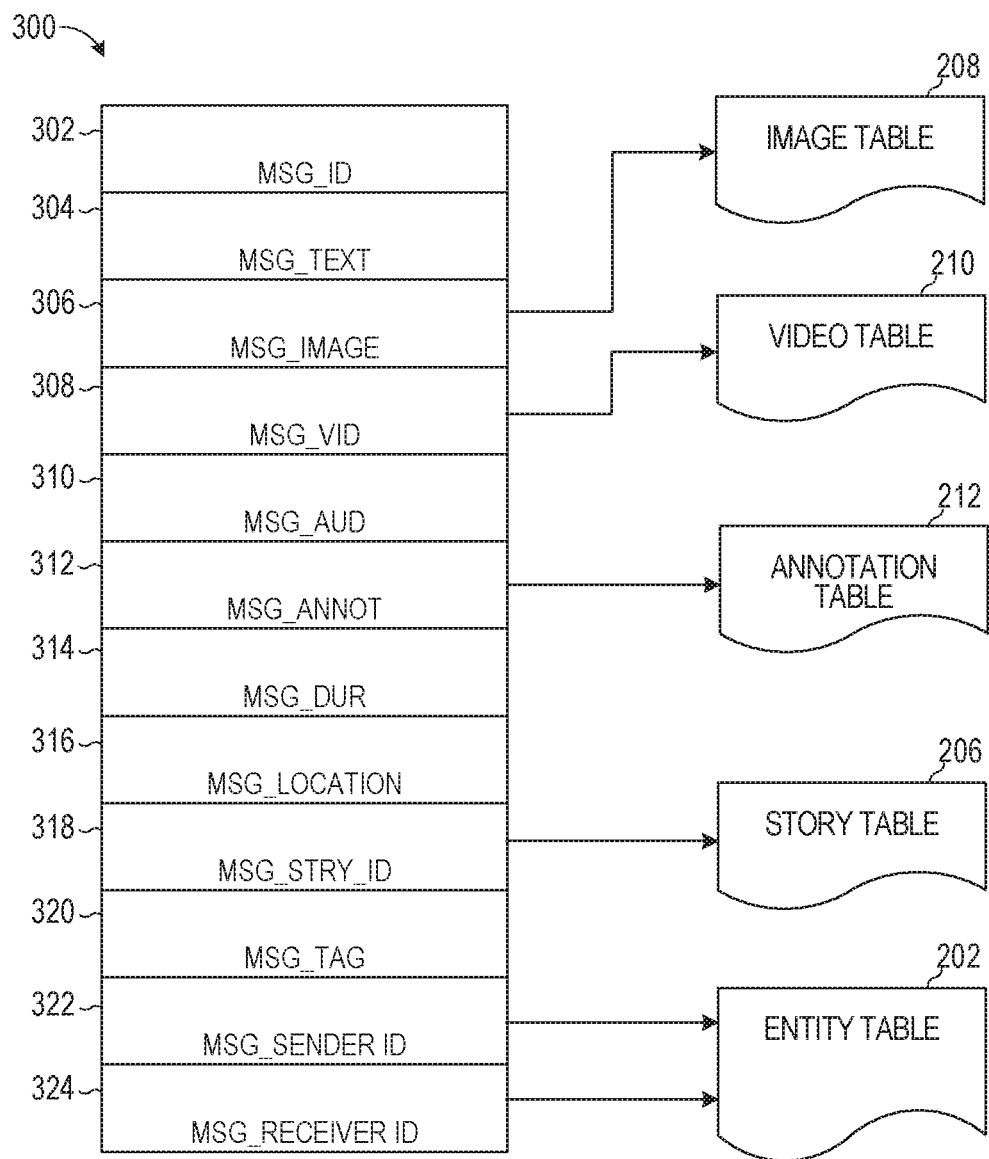
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
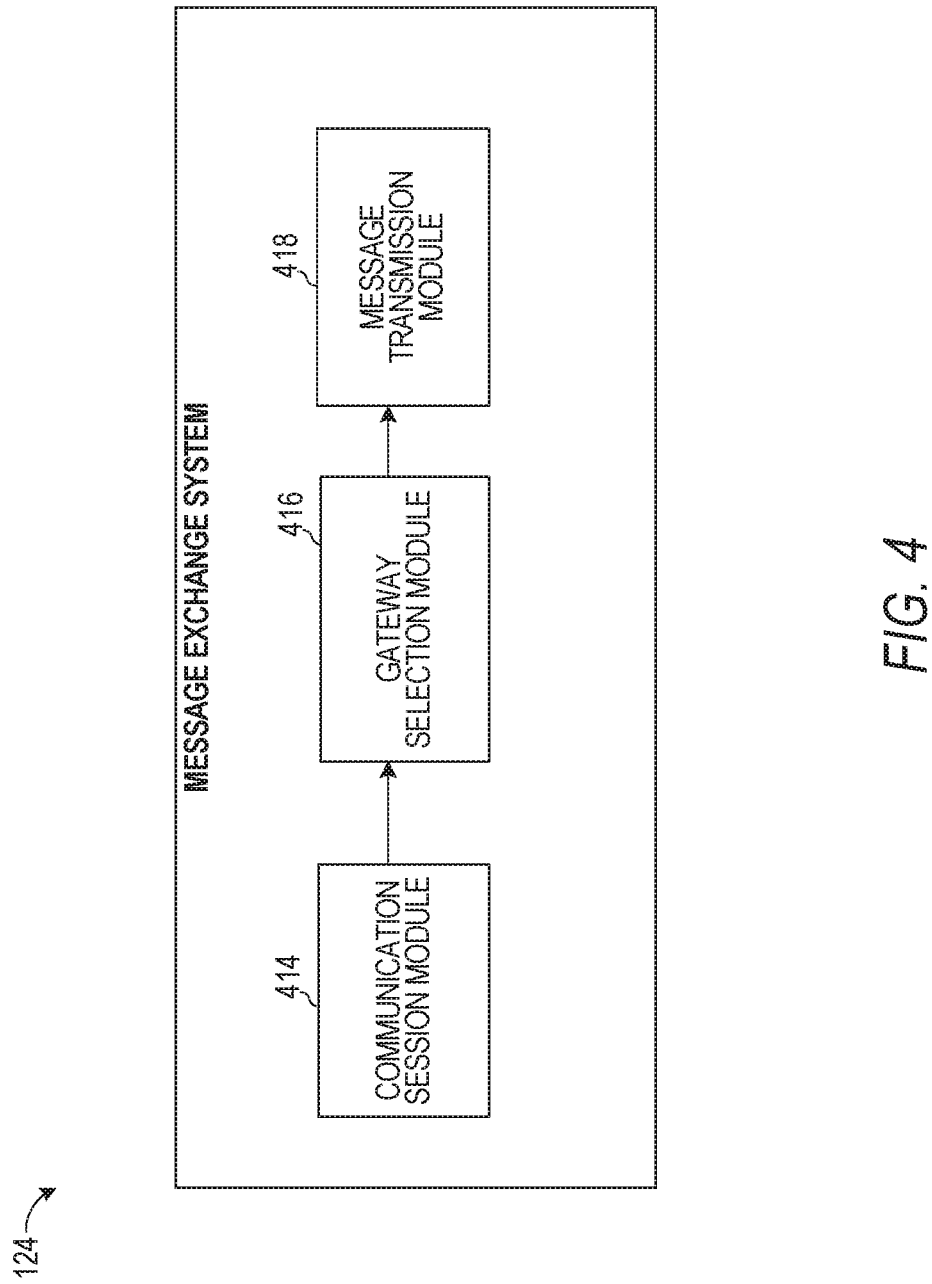
FIG. 4 is a block diagram showing an example message exchange system, according to example embodiments.

FIG. 4 is a block diagram showing an example message exchange system 124, according to example embodiments. Message exchange system 124 includes a communication session module 414, a gateway selection module 416, and a message transmission module 418. The communication session module 414 enables users to engage in a communication session to exchange messages with each other. In some cases, the communication session includes a group of three or more users in which case any message sent by one user is viewable by the other two users in the group. In some cases, the communication session includes only two users where one user sends messages to another user and vice versa.

After initiating a communication session using the communication session module 414, messages are transferred between users of the communication session using the communication session module 414. For example, the communication session module 414 in a first gateway 131 receives a message from a first user in the communication session and marks the message for transmission to a second user in the communication session. The communication session module 414 stores the message along with various information indicating the recipient, the communication session identifier, a sequence number, an identifier of the sender, and a timestamp representing when the message was received.

The communication session module 414 communicates with the gateway selection module 416 to identify a geographical region associated with the recipient. The gateway selection module 416 may search the gateway data 207 to identify an entry associated with the second user. The gateway selection module 414 may determine that the second user is associated with a second geographical region and may provide the identification of the second geographical region to the communication session module 414.

The communication session module 414 forwards the message from the first gateway 131 to a second gateway 131 located in the second geographical region. For example, the communication session module 414 provides the message to the message transmission module 418 with an indication of the second gateway 131. The message transmission module 418 may transmit the message to the second gateway 131 from the first gateway 131.

In some cases, the gateway selection module 416 identifies multiple geographical regions associated with the second user. In such cases, the gateway selection module 416 provides all of the geographical regions associated with the second user to the communication session module 414. The communication session module 414 may instruct the message transmission module 418 to forward the message to each gateway 131 that is located in the geographical region associated with the second user.

When the second user logs into the message application, via the second gateway 131, the communication session module 414 in the second gateway 131 receives an identifier of the second user and determines whether any messages that have not yet been delivered to the second user and that are intended for the second user to receive. In some cases, the communication session module 414 receives a last update timestamp from the second user. The communication session module 414 in the second gateway 131 searches the receive time of all the messages that are intended for receipt by the second user. The communication session module 414 selects those messages that have a receive time that is later than the last update timestamp. The communication session module 414 then sends all of the selected messages to the user device of the second user for presentation in the communication session of the messaging client application 104.

Figure 5:
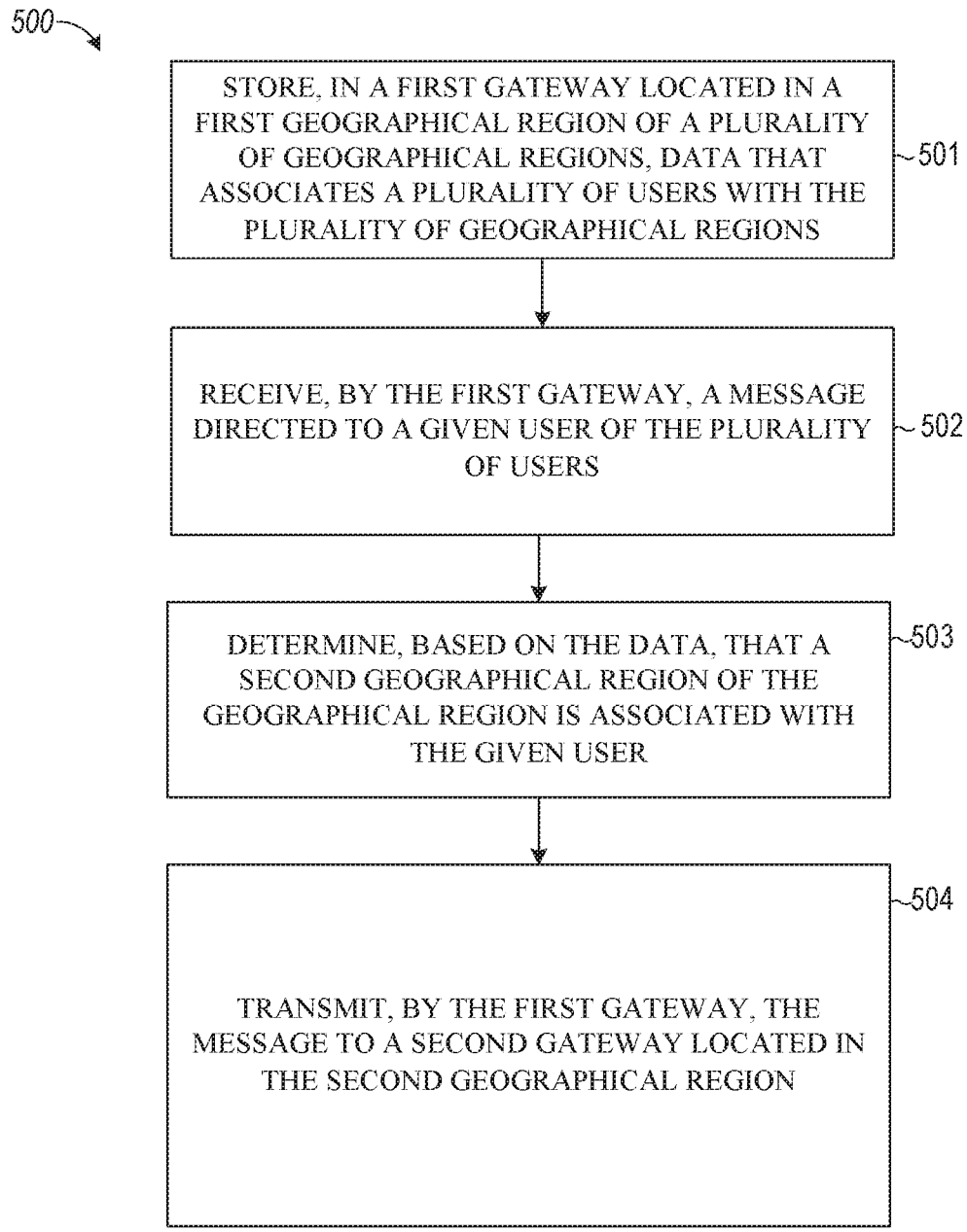
FIG. 5 is a flowchart illustrating example operations of the message exchange system, according to example embodiments.

FIG. 5 is a flowchart illustrating example operations of the message exchange system 124 in performing process 500, according to example embodiments. The process 500 may be embodied in computer-readable instructions for execution by one or more processors such that the operations of the process 500 may be performed in part or in whole by the functional components of the messaging server system 108, client device 102, and/or third-party application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, a first gateway located in a first geographical region of a plurality of geographical regions stores data that associates a plurality of users with the plurality of geographical regions. For example, a first gateway 131 stores the gateway data 207 that associates users of the messaging client application 104 with one or more geographical regions.

At operation 502, the first gateway receives a message directed to a given user of the plurality of users. For example, the first gateway 131 receives a message in a chat session from a first user who is in a first geographical region of the first gateway 131. The message may be directed to a second user in the chat session.

At operation 503, the first gateway determines, based on the data, that a second geographical region of the geographical region is associated with the second user. For example, the first gateway 131 searches the gateway data 207 for an entry associated with the second user and determines that the entry indicates that the second user is associated with a second geographical region.

At operation 504, the first gateway transmits the message to a second gateway located in the second geographical region. For example, the first gateway 131 transmits the message received from the first user to the second gateway located in the second geographical region associated with the second user. This way, when a device associated with the second user requests messages that were directed to the second user, the device can receive such messages from the second gateway to which the device connects in the second geographical region and need not connect to the first gateway which is further away from the second user in the first geographical region.

Figure 6:
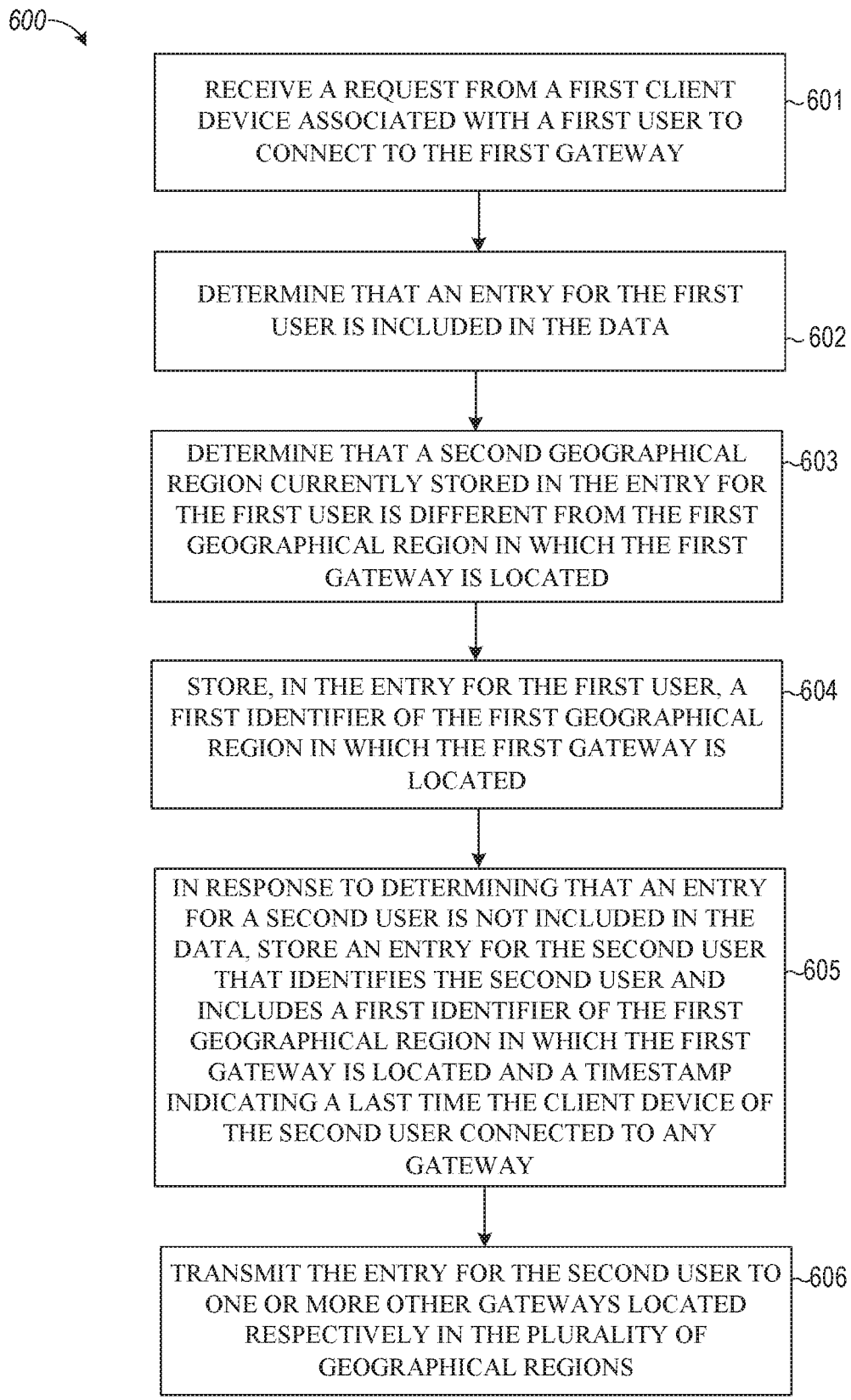
FIG. 6 is a flowchart illustrating example operations of the message exchange system, according to example embodiments.

FIG. 6 is a flowchart illustrating example operations of the message exchange system 124 in performing process 600, according to example embodiments. The process 600 may be embodied in computer-readable instructions for execution by one or more processors such that the operations of the process 600 may be performed in part or in whole by the functional components of the messaging server system 108, client device 102, and/or third-party application 105; accordingly, the process 600 is described below by way of example with reference thereto. However, in other embodiments, at least some of the operations of the process 600 may be deployed on various other hardware configurations. The process 600 is therefore not intended to be limited to the messaging server system 108 and can be implemented in whole, or in part, by any other component. Some or all of the operations of process 600 can be in parallel, out of order, or entirely omitted. Particularly, process 600 illustrates example operations for generating gateway data 207 and sharing that gateway data 207 across multiple gateways 130.

At operation 601, the computing system (e.g., a gateway 131) receives a request from a first client device associated with a first user to connect to the first gateway. For example, a client device 102 of a first user establishes a persistent bi-directional communication with a first gateway 131 in a first geographical region to receive messages from the first gateway 131.

At operation 602, the computing system determines that an entry for the first user is included in the data. For example, the first gateway 131 searches the gateway data 207 for an entry associated with the first user. In some cases, the first gateway 131 determines that an entry for the first user exists in the gateway data 207.

At operation 603, the computing system determines that a second geographical region currently stored in the entry for the first user is different from the first geographical region in which the first gateway 131 is located. For example, the entry in the gateway data 207 for the first user may indicate that the first user is associated with a second geographical region which differs from the first geographical region in which the first gateway 131 is located.

At operation 604, the computing system stores, in the entry for the first user, a first identifier of the first geographical region in which the first gateway is located. For example, the first gateway 131 adds the first geographical region to the entry for the first user in the gateway data 207 or replaces the second geographical region that is in the entry with the first geographical region.

The computing system concurrently with, after, or before receiving the request at operation 601 from the first client device to connect to the first gateway, receives a request from a second device of a second user to connect to the first gateway. Then, the computing system of the first gateway determines, similar to operation 602, that an entry for the second user is not included in the data. At operation 605, the computing system, in response to determining that an entry for a second user is not included in the data, stores an entry for the second user that identifies the second user and includes a first identifier of the first geographical region in which the first gateway is located and a timestamp indicating a last time the client device of the second user connected to any gateway. For example, the first gateway 131 determines that an entry for the second user does not exist in the gateway data 207. In response, the first gateway 131 generates and adds an entry for the second user. The entry includes an identifier for the second user along with an identifier of the first geographical region of the first gateway 131.

At operation 606, the computing system transmits the entry for the second user to one or more other gateways located respectively in the plurality of geographical regions. For example, the first gateway 131 transmits updates to the gateway data 207 to all of the other gateways 130.

Figure 7:
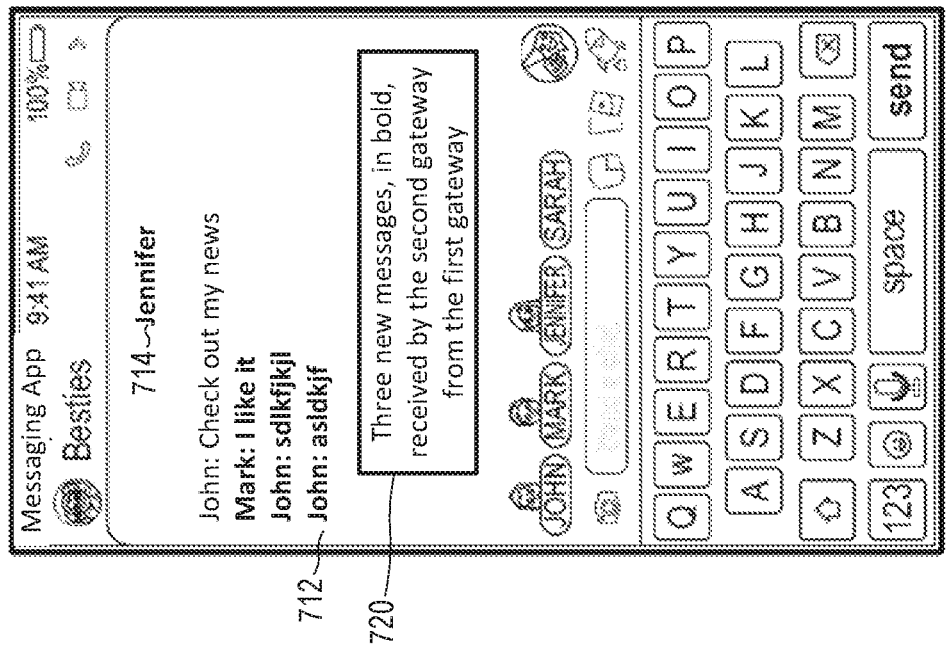
FIG. 7 shows illustrative inputs and outputs of the message exchange system, according to example embodiments.

FIG. 7 illustrates a graphical user interface 710 for receiving new messages, according to example embodiments. The message exchange system 124 may cause a graphical user interface 710 to be presented on a messaging client application 104. The graphical user interface 710 includes a display of messages that are part of a communication session between multiple users (e.g., John, Mark and Jennifer). The graphical user interface 710 is presented to a given user 714 (e.g., Jennifer). In some cases, once the given user 714 logs in and synchronizes the messages that are part of the communication session (e.g., at 9:41 AM), the message exchange system 124 provides messages that are specifically requested by the client device 102. The messages in the graphical user interface 710 may be visually distinguished based on a geographical region and/or gateway 131 location from which the messages were received. For example, the given user 714 may be in a second geographical location and the user John 712 may be in a first geographical location. The user John sends, via the first gateway 131 in the first geographical location to the given user 714, a particular message. The particular message may be forwarded by the first gateway 131 to a second gateway 131 in the second geographical location of the given user 714. The particular message may be marked in red or bold to indicate to the given user 714 that the message was received from a different gateway from that to which the device of the given user 714 connects.

In one example, a notification 720 is presented to the given user 714 in the graphical user interface 710 indicating that new messages were received by a second gateway from a first gateway and that such messages are presented in red or bold.

Figure 8:
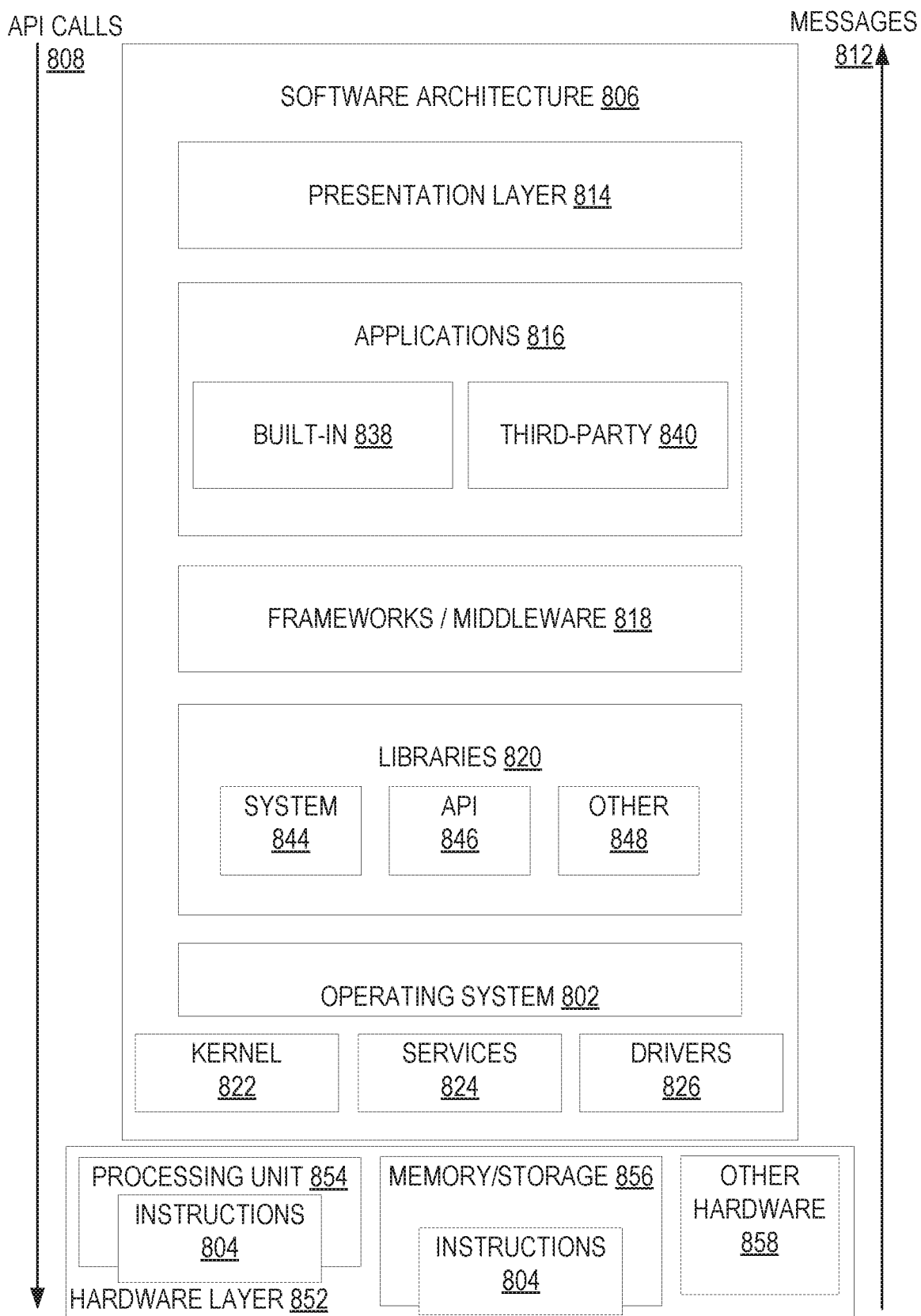
FIG. 8 is a block diagram illustrating a representative software architecture, which may be used in conjunction with various hardware architectures herein described, according to example embodiments.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and input/output (I/O) components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphical user interface functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built-in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
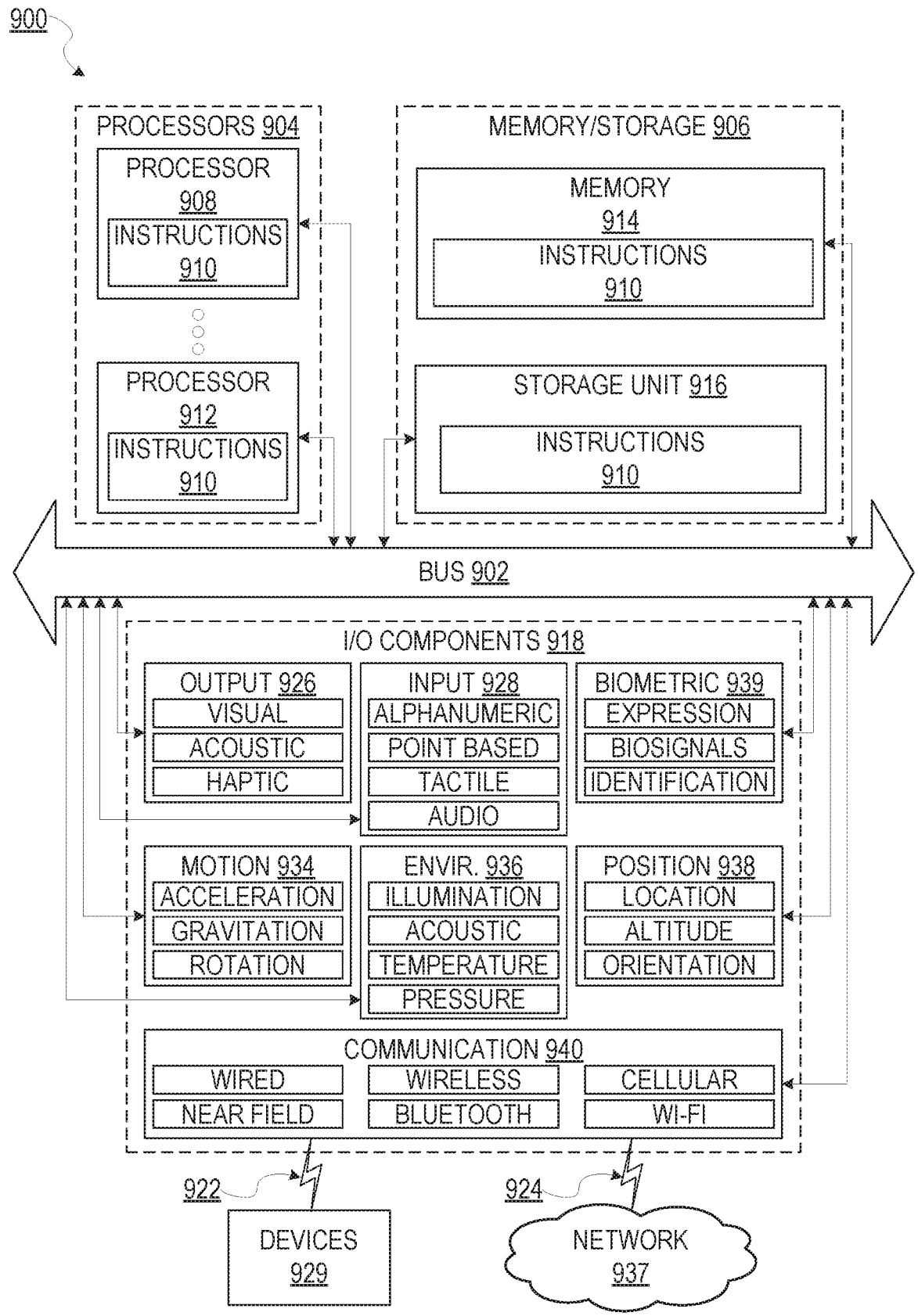
FIG. 9 is a block diagram illustrating components of a machine able to read instructions from a machine-readable medium (e.g., a machine-readable storage medium) and perform any one or more of the methodologies discussed herein, according to example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. In an example embodiment, the processors 904 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 908 and a processor 912 that may execute the instructions 910. The term "processor" is intended to include multi-core processors 904 that may comprise two or more independent processors (sometimes referred to as "cores") that may execute instructions 910 contemporaneously. Although FIG. 9 shows multiple processors 904, the machine 900 may include a single processor 908 with a single core, a single processor 908 with multiple cores (e.g., a multi-core processor), multiple processors 908, 912 with a single core, multiple processors 908, 912 with multiple cores, or any combination thereof.

The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 939, motion components 934, environmental components 936, or position components 938 among a wide array of other components. For example, the biometric components 939 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 937 or devices 929 via coupling 924 and coupling 922, respectively. For example, the communication components 940 may include a network interface component or other suitable device to interface with the network 937. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 929 may be another machine 900 or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geo-location, location via Wi-Fi® signal triangulation, location via detecting a NFC beacon signal that may indicate a particular location, and so forth.

Glossary

"CARRIER SIGNAL," in this context, refers to any intangible medium that is capable of storing, encoding, or carrying transitory or non-transitory instructions 910 for execution by the machine 900, and includes digital or analog communications signals or other intangible medium to facilitate communication of such instructions 910. Instructions 910 may be transmitted or received over the network 106 using a transitory or non-transitory transmission medium via a network interface device and using any one of a number of well-known transfer protocols.

"CLIENT DEVICE," in this context, refers to any machine 900 that interfaces to a communications network 106 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 106.

"COMMUNICATIONS NETWORK," in this context, refers to one or more portions of a network 106 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 106 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT). Evolution-Data Optimized (EVDO) technology, General Packet Radio Service (GPRS) technology. Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message 300 that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message 300 is transitory.

"MACHINE-READABLE MEDIUM," in this context, refers to a component, device, or other tangible media able to store instructions 910 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 908 or other programmable processor. Once configured by such software, hardware components become specific machines (or specific components of a machine 900) uniquely tailored to perform the configured functions and are no longer general-purpose processors 908. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 908 configured by software to become a special-purpose processor, the general-purpose processor 908 may be configured as respectively different special-purpose processors (e.g., comprising different hardware components) at different times. Software accordingly configures a particular processor 908 or processors 904, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor 908 or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 106 (e.g., the Internet) and via one or more appropriate interfaces (e.g., an API). The performance of certain of the operations may be distributed among the processors, not only residing within a single machine 900, but deployed across a number of machines. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR," in this context, refers to any circuit or virtual circuit (a physical circuit emulated by logic executing on an actual processor 908) that manipulates data values according to control signals (e.g., "commands," "op codes," "machine code," etc.) and which produces corresponding output signals that are applied to operate a machine 900. A processor 908 may, for example, be a CPU, a RISC processor, a CISC processor, a GPU, a DSP, an ASIC, a RFIC or any combination thereof. A processor 908 may further be a multi-core processor having two or more independent processors 904 (sometimes referred to as "cores") that may execute instructions 910 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
identifying a communication session between a group of a plurality of users comprising two or more users, two of the group of two or more users being in a plurality of geographical regions comprising first and second geographical regions;
based on identifying the communication session in which two of the group of two or more users are in the plurality of geographical regions, storing, in a first gateway located in the first geographical region of the plurality of geographical regions, data that associates the plurality of users with the plurality of geographical regions, the data stored in the first gateway comprising a first set of entries for users in the group of users associated with the first geographical region in which the first gateway is located and a second set of entries for users in the group of users associated with a second geographical region in which a second gateway is located, the first set of entries including a first entry that comprises a user identifier of a particular user and information that indicates how frequently the particular user connects to the first gateway in the first geographical region;
receiving as part of the communication session, by the first gateway, a message directed to a given user of the plurality of users;
determining, based on the data, that the second geographical region of the plurality of geographical regions is associated with the given user; and
transmitting, by the first gateway, the message to the second gateway located in the second geographical region.

2. The method of claim 1, wherein the given user is located in the second geographical region, wherein the message is received from a computing device of a second user of the plurality of users, the second user being located in the first geographical region.

3. The method of claim 1, further comprising:
determining, based on the data, that the given user is associated with the second geographical region and a third geographical region of the plurality of geographical regions; and
in response to determining that the given user is associated with the second geographical region and the third geographical region, transmitting, by the first gateway, the message to the second gateway and a third gateway from the first gateway.

4. The method of claim 1, wherein the second set of entries comprise a second entry with a second user identifier that represents the given user, further comprising:
detecting, by the first gateway, a connection from a client device of the given user;
in response to detecting the connection, searching the data for the second user identifier that represents the given user; and
in response to identifying the second entry based on the second user identifier, updating the second entry to indicate that the given user is also associated with the first geographical region, such that the second entry associates the second user identifier with the first geographical region and the second geographical region, wherein the first gateway comprises one or more servers configured to deliver messages to computing devices of users in the first geographical region, and wherein the second gateway comprises one or more servers configured to deliver messages to computing devices of users in the second geographical region.

5. The method of claim 4, wherein the second entry comprises information that indicates how frequently and recently the given user connected to the first gateway relative to the second gateway.

6. The method of claim 1, further comprising:
maintaining a first persistent bi-directional communication between computing devices for a first set of users located in the first geographical region and the first gateway; and
maintaining a second persistent bi-directional communication between computing devices for a second set of users in the second geographical region and the second gateway.

7. The method of claim 1, further comprising replicating the data that associates the plurality of users with the plurality of geographical regions comprising the first and second entries across the first and second gateways periodically or continuously.

8. The method of claim 1, wherein storing the data comprises:
receiving a request from a first client device associated with a first user to connect to the first gateway; and
in response to receiving the request, performing operations comprising:
connecting the first client device to the first gateway;
determining that an entry for the first user is included in the data; and
in response to determining that the entry for the first user is included in the data, updating the data to reflect the first geographical region in which the first gateway is located and a timestamp indicating a last time the first client device connected to any gateway.

9. The method of claim 8, wherein updating the data comprises:
determining that a third geographical region currently stored in the entry for the first user is different from the first geographical region in which the first gateway is located; and
storing, in the entry for the first user, a first identifier of the first geographical region in which the first gateway is located in response to determining that the third geographical region currently stored in the entry for the first user is different from the first geographical region in which the first gateway is located.

10. The method of claim 9, further comprising storing, in the entry for the first user, frequency information indicating how often the first client device connects to the first gateway and how often the first client device connects to a third gateway located in the third geographical region.

11. The method of claim 8, further comprising:
receiving a request from a second client device associated with a second user to connect to the first gateway; and
in response to receiving the request, performing operations comprising:
connecting the second client device to the first gateway;
determining that an entry for the second user is not included in the data; and
in response to determining that the entry for the second user is not included in the data, storing an entry for the second user that identifies the second user and includes a first identifier of the first geographical region in which the first gateway is located and a timestamp indicating a last time the second client device connected to any gateway.

12. The method of claim 11, further comprising transmitting the entry for the second user to one or more other gateways located respectively in the plurality of geographical regions.

13. The method of claim 1, wherein the second gateway receives a request from a computing device of the given user to connect to the second gateway, and wherein the second gateway sends the message to the computing device of the given user in response to the request.

14. The method of claim 1, wherein the first set of entries each comprise a timestamp indicating when a user associated with a respective user identifier connected to the first gateway.

15. The method of claim 1, further comprising:
determining, based on the data, that the given user repeatedly or periodically connects to multiple gateways located in respective geographical regions; and
in response to determining that the given user repeatedly or periodically connects to the multiple gateways located in the respective geographical regions, transmitting the message to the multiple gateways from the first gateway.

16. The method of claim 1, further comprising:
establishing a communication session between a first user and the given user, the first user being associated with the first geographical region;
receiving, by the first gateway, the message from a computing device of the first user in the communication session;
determining, based on the data, that the given user is associated with the second geographical region; and
in response to determining, based on the data, that the given user is associated with the second geographical region, transmitting the message to the second gateway to cause the message to be presented to a second user in the communication session.

17. The method of claim 1, wherein the first geographical region comprises a first country, and wherein the second geographical region comprises a second country.

18. A system comprising:
a processor configured to perform operations comprising:
identifying a communication session between a group of a plurality of users comprising two or more users, two of the group of two or more users being in a plurality of geographical regions comprising first and second geographical regions;
based on identifying the communication session in which two of the group of two or more users are in the plurality of geographical regions, storing, in a first gateway located in the first geographical region of the plurality of geographical regions, data that associates the plurality of users with the plurality of geographical regions, the data stored in the first gateway comprising a first set of entries for users in the group of users associated with the first geographical region in which the first gateway is located and a second set of entries for users in the group of users associated with a second geographical region in which a second gateway is located, the first set of entries including a first entry that comprises a user identifier of a particular user and information that indicates how frequently the particular user connects to the first gateway in the first geographical region;
receiving as part of the communication session, by the first gateway, a message directed to a given user of the plurality of users;

determining, based on the data, that the second geographical region of the plurality of geographical regions is associated with the given user; and transmitting, by the first gateway, the message to the second gateway located in the second geographical region.

19. The method of claim 1, wherein the first set of entries each comprises information that indicates how frequently a user represented by a respective user identifier connects to different gateways in different geographical regions.

20. A non-transitory machine-readable storage medium that includes instructions that, when executed by one or more processors of a machine, cause the machine to perform operations comprising:

identifying a communication session between a group of a plurality of users comprising two or more users, two of the group of two or more users being in a plurality of geographical regions comprising first and second geographical regions;

based on identifying the communication session in which two of the group of two or more users are in the plurality of geographical regions, storing, in a first gateway located in the first geographical region of the plurality of geographical regions, data that associates the plurality of users with the plurality of geographical regions, the data stored in the first gateway comprising a first set of entries for users in the group of users associated with the first geographical region in which the first gateway is located and a second set of entries for users in the group of users associated with a second geographical region in which a second gateway is located, the first set of entries including a first entry that comprises a user identifier of a particular user and information that indicates how frequently the particular user connects to the first gateway in the first geographical region;

receiving as part of the communication session, by the first gateway, a message directed to a given user of the plurality of users;

determining, based on the data, that the second geographical region of the plurality of geographical regions is associated with the given user; and transmitting, by the first gateway, the message to the second gateway located in the second geographical region.

\* \* \* \* \*

UNITED STATES PATENT AND TRADEMARK OFFICE
CERTIFICATE OF CORRECTION

| | |
|---|---|
| PATENT NO. | : 11,228,551 B1 |
| APPLICATION NO. | : 16/789101 |
| DATED | : January 18, 2022 |
| INVENTOR(S) | : Baron et al. |

It is certified that error appears in the above-identified patent and that said Letters Patent is hereby corrected as shown below:

On the Title Page

On page 2, in Column 1, under Item (56) "U.S. Patent Documents", Line 74, delete "7,519,870" and insert --7,519,670-- therefor On page 3, in Column 1, under Item (56) "U.S. Patent Documents", Line 23, after "Murphy et al.", insert --9,407,712 B1 8/2016 Sehn--

On page 3, in Column 1, under Item (56) "U.S. Patent Documents", Line 73, after "Currans", insert --2005/0114783 A1 5/2005 Szeto--

On page 3, in Column 2, under Item (56) "U.S. Patent Documents", Line 60, delete "2008/0021421" and insert --2008/0214210-- therefor On page 4, in Column 1, under Item (56) "U.S. Patent Documents", Line 3, delete "2009/0008971" and insert --2009/0089710-- therefor On page 4, in Column 2, under Item (56) "U.S. Patent Documents", Line 24, delete "2012/0028559" and insert --2012/0028659-- therefor On page 4, in Column 2, under Item (56) "U.S. Patent Documents", Line 46, delete "2012/0001651" and insert --2012/0165100-- therefor On page 6, in Column 1, under Item (56) "Other Publications", Lines 17-18, delete "international" and insert --International-- therefor On page 6, in Column 2, under Item (56) "Other Publications", Line 1, delete "introduces" and insert --Introduces-- therefor Signed and Sealed this
Thirty-first Day of October, 2023

Katherine Kelly Vidal
*Director of the United States Patent and Trademark Office*